United States Patent

[11] 3,569,869

[72] Inventors Walter O. Sutton, Jr.
20-25 Terrace Drive, Feasterville, Pa. 19047;
Norman Everhart, 440 Heaton Road, Hatboro, Pa. 19040

[21] Appl. No. 738,918
[22] Filed June 21, 1968
[45] Patented Mar. 9, 1971

[54] THERMAL COMPENSATION FOR A RADIO FREQUENCY TRANSMISSION LINE
15 Claims, 4 Drawing Figs.

[52] U.S. Cl. 333/16, 330/143, 333/18, 333/28
[51] Int. Cl. H04b 3/10, H04b 3/14
[50] Field of Search 333/16, 18, 28; 179/170 (A); 330/143

[56] References Cited

UNITED STATES PATENTS

| | | | |
|---|---|---|---|
| 2,326,826 | 8/1943 | Ballington | 333/18 |
| 2,465,531 | 3/1949 | Green | 333/16 |
| 3,387,232 | 6/1968 | Graham | 333/16X |
| 3,395,370 | 7/1968 | Albersheim | 333/18 |

*Primary Examiner*—Herman Karl Saalbach
*Assistant Examiner*—Paul L. Gensler
*Attorney*—Hopgood & Calimafde

ABSTRACT: An electric network is described for compensating a transmission line system for temperature variations. Two types of compensating networks are described, one varying in response to temperature; the other in response to a pilot signal provided for this purpose. A transmission line equalizer is described in conjunction with the thermal compensation network to show the advantages of separating thermal compensation from the equalization network.

INVENTORS.
WALTER O. SUTTON, JR
NORMAN EVERHART
BY
Hopgood & Calimafde
ATTORNEYS INVENTORS.
WALTER O. SUTTON, JR.
NORMAN EVERHART
BY
Hopgood & Calimafde
ATTORNEYS

THERMAL COMPENSATION FOR A RADIO FREQUENCY TRANSMISSION LINE

This invention relates to a device which compensates for the change in the characteristics of a transmission line as a function of temperature.

In the transmission of radio frequency signals along a transmission cable, equalizer networks are used to compensate for different characteristics of the cable as a function of frequency. Generally such cables are used to transmit a wide band of frequencies, say from 5 to 100 MHz or from 50 to 250 MHz. A typical coaxial cable used for the transmission of such wide band frequency spectrum presents significant variation of its transmission characteristics over the bandwidth. In other words, the signal is generally attenuated to a larger extent at the high end of the band than at the low end. In order to compensate for such variation, equalizing networks have been employed and these are referred to as line equalizers. A line equalizer of 25 db will compensate for a cable whose length exhibits 25 db attenuation at a standard frequency.

In addition to the frequency sensitivity of the cable, the cable further exhibits a change in attenuation as a function of temperature. In the prior art, such additional temperature variation was compensated for by including in the line equalizer several temperature-sensitive components.

In a typical transmission line system of about 15 miles in length, a plurality of amplifiers and line equalizers are periodically spaced generally at intervals of about 2000 feet. The equalizers provide a substantially flat transmission line response as a function of frequency and the amplifiers compensate for attenuation in the cable. Amplifier gain errors or the mismatching of line equalizers impose economic penalties that increase significantly with transmission lines of considerable length. For instance, if the line equalizer exhibits a substantial mismatch, the economies sought to be obtained with such device are partially mitigated. Typically, the inclusion of temperature-compensation in a line equalizer may affect the impedance match of the device with the cable system. This mismatch can arise during installation of an entire transmission line system or during repair, or as the result of different aging of various components in the equalizer. Realignment of the temperature-compensated line equalizer is complicated by the inclusion of the temperature-sensitive elements which may vary during the alignment if the ambient temperature changes or may be detrimentally affected by the realignment itself. Furthermore, the dual function of the line equalizer, i.e., compensation for attenuation changes as a function of frequency as well as compensation for attenuation changes as a function of temperature, imposes a design compromise which falls short of a full utilization of the maximum capabilities of the transmission line system.

It is therefore an object of this invention to provide a radio frequency transmission line system exhibiting a substantially flat attenuation response both as a function of frequency as well as temperature.

It is a further object of this invention to provide a radio frequency transmission line system which is capable of simple alignment both during installation and thereafter.

It is still further an object of this invention to provide an economical thermal compensation network for a radio frequency transmission line system of substantial length.

These objects, features and advantages of the invention will become apparent upon reference to the following description of the invention taken in conjunction with the drawings, wherein.

Briefly stated, the invention contemplates separating the thermal compensation function from the line equalizer network with a separate thermal compensation network which is matched to the transmission line system.

In the cable transmission line field, it is customary to refer to equalizer circuits as circuits which exhibit particular tilts or angles. These terms refer to the curve drawn by plotting attenuation as a function of frequency where frequency is plotted on a logarithmic scale and attenuation is plotted as a function of decibels. In this respect the attenuation curve for a cable when plotted as a function of frequency will show a lower attenuation at lower frequencies and gradually increase toward the high end of the frequency band. It is further customary in describing cable transmission line systems to refer to a cable length as exhibiting a particular attenuation in db. Such equivalent cable length in db is determined at a standard frequency, as is well known. A 6 db equalizer network thus means a network which compensates for a variation in attenuation as a function of frequency for a cable whose length is such that it exhibits 6 db attenuation at the standard frequency. The amount of compensation needed from an equalizer network depends upon the bandwidth of the radio frequencies sought to be transmitted over the system as well as the cable length.

Figure 1:
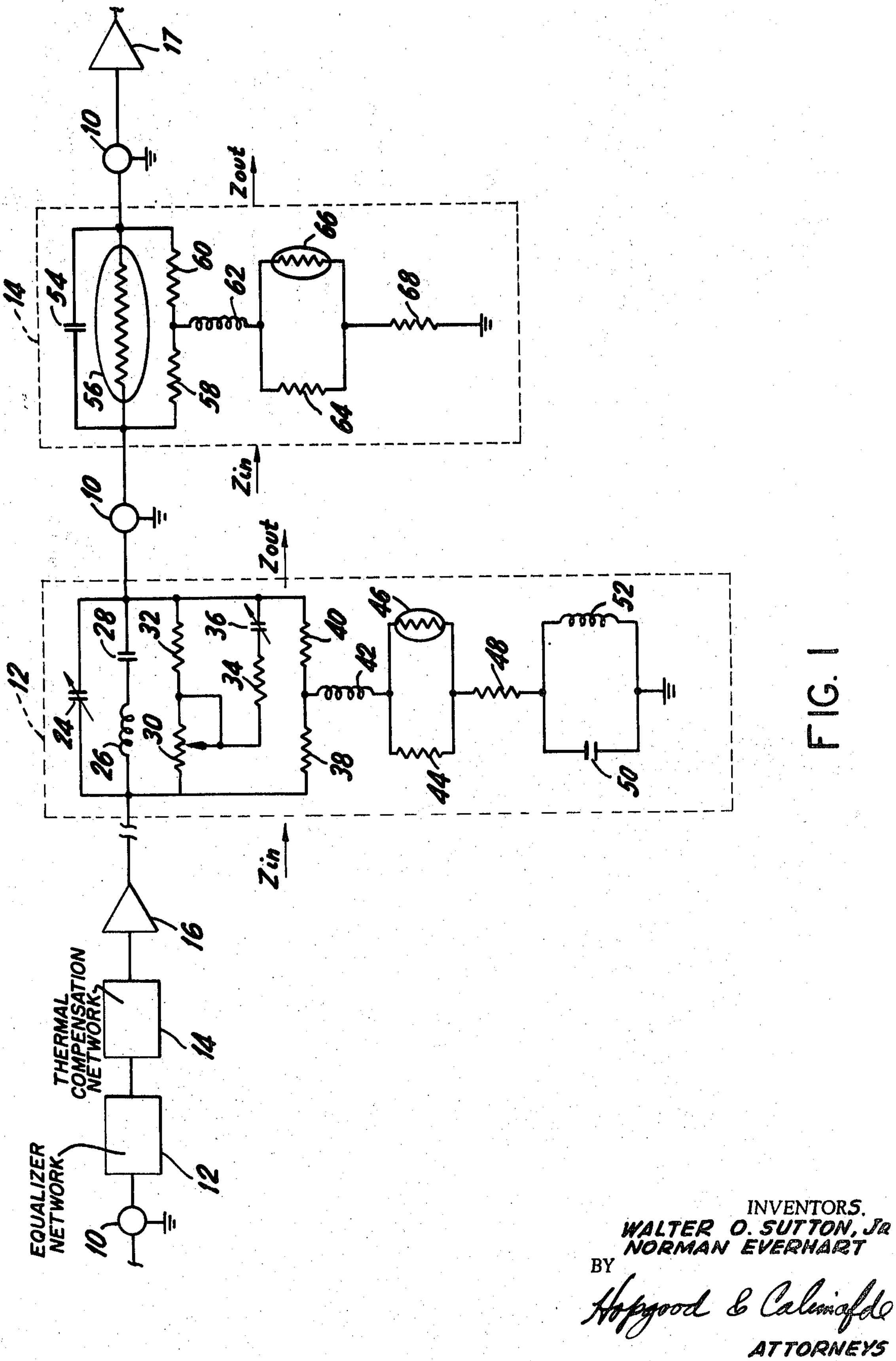
FIG. 1 shows a schematic representation of the thermal compensation network used in conjunction with a radio frequency transmission line system.

In FIG. 1 a transmission line system for transmitting radio frequencies over a bandwidth having a low frequency end at a frequency $F1$ and a high frequency end at a frequency $F2$ is shown. The cable 10 is of the coaxial type and has a characteristic impedance of about 75 ohms. The section of the cable system shown in FIG. 1 spans approximately two amplifiers spaced from one another by about 2000 feet and FIG. 1 illustrates an equalizer network 12, a thermal compensation network 14 and an amplifier 16. The particular circuitry employed in the equalizer 12 and thermal compensator 14 is shown in connection with the span between the amplifiers 16 and 17. The equalizer network 12 is of the bridge $T$ type with an input impedance and an output impedance matched with the characteristic impedance of the coaxial cable 10. The equalizer circuit includes several circuit legs in parallel relationship such as the capacitor 24, the inductance 26 and capacitor 28, the resistors 30 and 32, as well as the series connection of the resistor 34 and the capacitor 36, the series connection being coupled to some intermediate point of the variable resistor 30 as shown in the drawing. Another parallel network is provided with resistors 38 and 40.

As is well known in the design of bridge $T$ networks, the central leg of the $T$ is designed to provide, in conjunction with the top portion of the $T$ the input and output characteristic impedance equivalent to the coaxial cable impedance which is, in this case, 75 ohms. Accordingly, an inductance 42 is coupled from the interconnection of resistors 38 and 40 to ground via a parallel combination of resistors 44 and 46, a series resistor 48 and the parallel combination of capacitor 50 and inductance 52. The resistor 46 has some temperature sensitivity and is included in the equalization circuit to provide proper temperature compensation at the very low end of the frequency band. This resistor will not be necessary if the particular frequency band for which this circuit is designed is reduced and the low frequency end is raised.

The response of the equalizer network is tailored to the length of cable to be compensated, and the bandwidth of interest, and exhibits the inverse attenuation characteristic as a function of frequency to that of the cable. To accomplish this, several of the parallel legs are so designed to take effect at different frequencies to control the slope of the response curve of the network 12. Typically the network 12 is provided with component values which yield 20 db of equalization at 95 MHz at a preselected reference temperature of 70° F. where the bandwidth is approximately between 5 to 100 MHz. This is achieved by employing components having the following values:

Inductance 26 equals 0.23 $\mu H$; capacitor 28 equals 11 pF; capacitor 24 equals 5 to 18 pF; variable resistor 30 has a range of from 0 to 500 ohms; resistor 32 is equal to 240 ohms; resistor 34 equals 160 ohms; capacitor 36 equals 5 to 60 pF;

resistors 38 and 40 equal 75 ohms each; inductance 42 equals approximately .3 $\mu H$; resistor 44 equals 75 ohms; thermistor 46 equals approximately 30 ohms and varies negatively with increasing temperature; resistor 48 equals 24 ohms; inductance 52 equals .068 $\mu H$; and capacitor 50 equals approximately 39 pf.

The output of the network 12 is taken at the common junction of capacitors 24 and 28 and coupled to the input of the thermal compensation network 14. The input and output impedances of the thermal compensating network 14 are also designed to match with the characteristic impedance of the coaxial cable 10, i.e. 75 ohms. The thermal compensation network 14 is again in the form of a bridge *T* circuit which includes in the upper portion of the *T* three parallel legs, respectively; a capacitor 54, a thermistor 56 and a pair of series-connected resistors 58 and 60. The upright portion of the *T* is composed of an inductance 62 connected to the common junction between resistors 58 and 60 and coupled to ground via the parallel connection of resistor 64 and thermistor 66, and then through resistor 68.

The thermal compensation network is designed to provide a tilt response over the bandwidth between *F1* and *F2* that compensates for temperature variations of the cable length preceding it. It is not necessary that a thermal compensation network be provided between each interval of cable length between adjacent amplifiers and one network 14 may compensate for several intervals. The number of intervals for which the network 14 may compensate is entirely dependent upon the degree of tilt that this network can provide which in turn is dependent upon the thermistors used in the circuit. Furthermore, the fact that the thermal compensation network is matched to the cable permits its inclusion at any convenient location.

Figure 2:
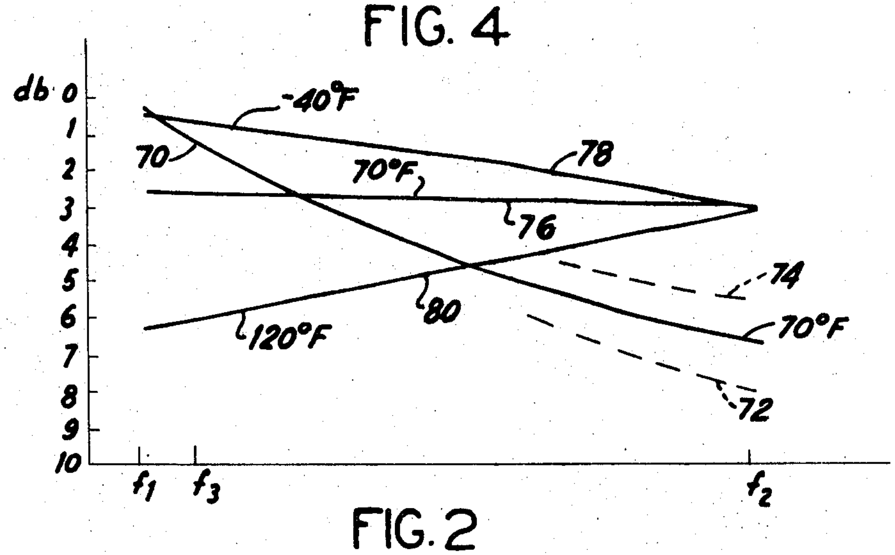
FIG. 2 shows several frequency response curves.

In FIG. 2, the curve 70 illustrates the attenuation response of a cable length at a particular temperature, say 70° F. As can be seen from the figure, this curve slopes negatively and for different temperatures will present a different attenuation. For instance, at a higher temperature, the curve 70 will move towards the curve 72 and at a lower temperature will rise toward the curve 74. Compensations for these temperature variations are thus needed. Compensation is provided with a network having a reverse slope to that of curve 70.

Since the equalizer network 12 is designed to compensate the cable length preceding it at a preselected temperature of 70° F., the response curve of the thermal compensation network 14 should essentially be flat at 70° F. This is illustrated by the curve 76 which runs substantially parallel to the abscissa. At the extreme low temperature of −40° F., the response curve must be tilted in such manner that it provides a negative slope tending to further reduce attenuation at the low end of the band with correspondingly smaller attenuation toward the high end. Correspondingly at the extreme high temperature of 120° F., the curve 80 provides a positive attenuation characteristic with maximum attenuation toward the low end of the band and minimum attenuation toward the high end. In total, the response curve for the thermal compensation network 14 is a tilting network which has its pivot at the high end of the band. It is realized that variations in the degree of attenuation of these curves are possible and necessary for different bandwidths and cable lengths and the particular curve shown in FIG. 2 is for illustrative purposes only. Typically, a network 14 which will provide the tilt shown in FIG. 2 over a bandwidth of between 5 and 100 MHz is obtained by attributing to the components the following values: Capacitor 54 equals 41 pF; thermistor 56 equals 56 ohms increasing in resistance with increases in temperature; resistors 58 and 60 equal 75 ohms each; inductor 62 equals .3 $\mu H$; resistor 64 equals 56 ohms; thermistor 66 equals 30 ohms decreasing in resistance with increasing temperature; resistor 68 equals 56 ohms.

As can be seen from the positive characteristic of the thermistor 56, at very low temperatures the capacitor 54 is effectively bypassed to produce relatively low attenuation of low frequencies. On the other hand, its resistance value is not too low so that for high frequencies the capacitor 54 will still have appreciable impedance in relationship to the resistance of the thermistor 56. The attenuation at the high end of the band with very low temperatures is still larger than the low end attenuation.

When the temperature rises to the upper extreme, the resistance of thermistor 56 will have increased in value substantially so that at very low frequencies a significant attenuation is produced. However, the impedance presented by capacitor 54 at this frequency and temperature is small in comparison with the resistance presented by thermistor 56 so that now the attenuation at the high end of the band is less than the attenuation at low frequencies.

The network in the upright leg of the *T* bridge circuit is adjusted to provide the corresponding behavior in order to obtain the proper matching of the input and output impedances with the characteristic impedance of the coaxial cable 10, i.e., 75 ohms.

Figure 3:
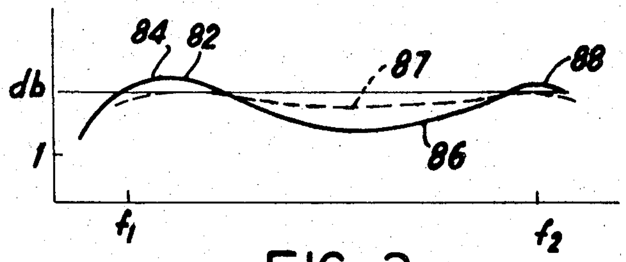
FIG. 3 shows the fine tuning made possible by the invention.

A significant advantage is obtained with the circuitry as shown in FIG. 1 in that now the equalizer network 12 may be adjusted or aligned to provide optimum response independent of the temperature variations. This is clearly illustrated in FIG. 3 wherein the curve 82 illustrates the typical response characteristic of the entire cable length over the bandwidth between frequencies *F1* and *F2* for a line equalizer including temperature compensation. The curve shows a peak 84 at the low end, a valley 86 in the middle and another peak 88 at the high end. Typically such peaks and valleys may be separated from one another by several db and for optimum operation of the entire cable transmission system it is desirable to reduce these differences as much as possible. In the prior art equalizer, which included thermal compensation, such reduction was not possible without deteriorating the thermal compensation features built into the equalizer. For instance if one were to try to raise the valley 86, then the net effect usually turned out to detrimentally adjust the thermal response of the network with the result that little was gained and usually some additional loss was introduced. With the separation of the thermal compensation network with the line equalizer shown in FIG. 1, it is now possible to trim the line equalizer to remove the peaks and valleys to a significant extent.

Thus, the valley 86 may be raised by, for instance, adjustment of the value of the capacitor 24 and correspondingly the peaks 84 and 88 may be reduced as indicated by the dashed curve 87 by respectively varying the capacitor 36 and the combined resistance values of resistors 30 and 32. Typically, the response characteristic of a transmission line incorporating the thermal compensation network may have peaks and valleys separated from one another at most by a few tenths of a db over a frequency range of from 5 to 100 MHz. Furthermore, realignment or adjustment of the system after installation is significantly simplified and substantially eliminates the lengthy interruption of service ordinarily required. Customers using the cable transmission system for the transmission of television signals do not take kindly to lengthy interruption of service.

Figure 4:
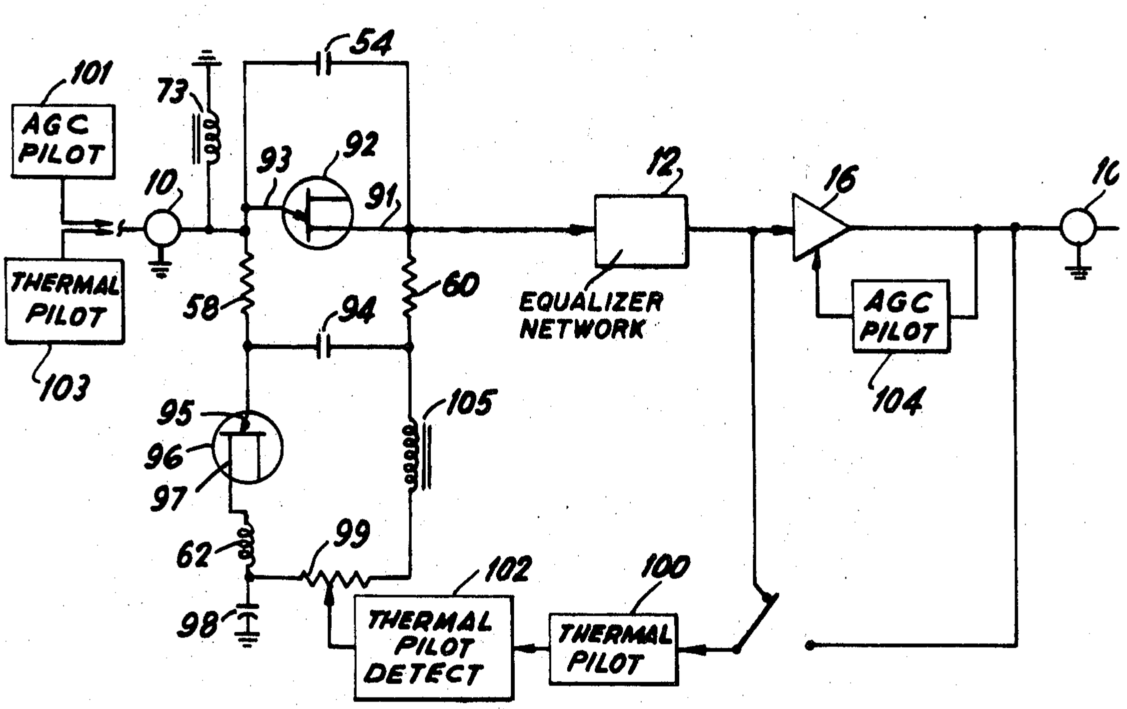
FIG. 4 shows an alternate arrangement for accomplishing the thermal compensation.

In FIG. 4 an alternate arrangement is shown wherein the temperature-sensitive resistors in the thermal compensation network have effectively been replaced with a voltage variable resistance. The purpose of this change is to provide an automatic control mechanism that is rather close-loop versus the open-loop design utilized in the network shown in FIG. 1. By open-loop is meant the idea that the response characteristics of the transmission line in FIG. 1 are estimated and the corresponding compensation is introduced by a network that is carefully designed. In FIG. 4, however, the variable resistors are replaced with voltage-controllable devices which respond to a signal which is indicative of the actual attenuation encountered in the transmission line and which, by careful selection, can be made to reflect the ambient temperature variations of the line.

In FIG. 4 a different thermal compensation network is illustrated in detail. A line equalizer circuit 12 is used and may be placed at any point in the line; preferably it is included in the amplifier 16. A capacitor 54 is again provided across the upper part of the *T* bridge network but the thermistor 56 is replaced with a voltage-controllable resistance device 92 which, as indicated in the schematic of FIG. 4, is a unijunction transistor which has its emitter 93 coupled to the input of the network 14 and a base 91 coupled to the output of the compensating network. Other variable resistance devices could be employed such as a PIN diode. In common with the input and the emitter 93 is a resistor 58 which is effectively coupled to another resistor 60 via coupling capacitor 94. The capacitor 94 has such a value that it is effectively a short circuit over the bandwidth so that for practical purposes resistors 58 and 60 are coupled to one another. In common with the junction of the resistor 58 and the capacitor 94 is again the emitter 95 of a unijunction variable resistance device 96 which has its base 97 coupled to an inductance 62 and effectively coupled to ground via the bypass capacitor 98. A source of DC signal is supplied through a DC control voltage resistor 99 which has one terminal connected in common with the capacitor 98 and the inductance 62, and the other terminal coupled to an RF choke 105 with the other end of the choke coupled to the common junction of the capacitor 94 and the resistor 60. The output of the network 14 is obtained from the common junction between the capacitor 54 and the base 91 of the variable resistance device 92 and coupled to the input of the line equalizer network 12.

The cable system is provided with two types of pilot signals, an AGC pilot preferably about 75 MHz, and a thermal pilot preferably about 19 MHz. These pilot signals are preferably inserted at the beginning of the cable and are shown in FIG. 4 as part of the embodiment. The thermal pilot signal is generated in oscillator 103 which has its amplitude as well as frequency carefully stabilized according to conventional circuits. In a similar manner the AGC pilot signal is generated in an oscillator 101. The frequencies of these oscillators are carefully selected. The AGC pilot is preferably placed at the high end of the bandwidth and the thermal pilot at the low end. The reversal of the pilot positions in the band is possible, provided the two pilots are separated in frequency to provide a better control.

Typically a separation of the pilot signals is preferred at about 50 percent or greater of the bandwidth. Thus if the bandwidth extends from 5 to 100 MHz, then a thermal pilot separated from the AGC pilot by about 50 MHz is preferred. In addition, the pivot point for the thermal pilot signal is generally preferred to occur at some distance in frequency from the end of the bandwidth. Thus a preferred pivot point for the thermal pilot is located near an edge of the bandwidth, in a region which spans a frequency range up to about 25 percent of the total bandwidth. If necessary, the thermal pilot may be located close to an edge of the bandwidth. In the embodiment shown, the thermal pilot is located at 19 MHz for a bandwidth from 5 to 100 MHz.

Similarly, the AGC pilot is preferably located toward an edge of the bandwidth although its location may vary from the end up to about 35 percent of the bandwidth. For the embodiment shown, the AGC pilot is located at about 75 MHz with the thermal pilot being located near the opposite end of the bandwidth.

The line equalizer in turn is coupled to the input of the amplifier 16. Around the amplifier 16 is an AGC control circuit 104 which includes a frequency-selective network responsive to the particular pilot signal used for automatic gain control. The output of the selection network is passed through a detection circuit which generates a DC voltage to control the gain of the amplifier 16. The automatic gain control pilot frequency in the arrangement shown is selected at the high end of the band, approximately 75 MHz. In addition, the output of the equalizer network 12 is fed back through a thermal pilot selection network 100 and a thermal pilot detection circuit 102 to provide a DC control voltage at resistor 99. This DC control voltage has an amplitude indicative of the amplitude of the thermal pilot signal which, in the arrangement shown in FIG. 4, has a frequency which is selected generally at the low end of the band as indicated at *F*3 in FIG. 2. Alternatively, the output of the amplifier 16 may be coupled to the thermal pilot selection network 100 to generate the DC control voltage. The DC control voltage is then applied through the connections indicated in the circuit to control the variable resistance devices 92 and 96.

The control voltage determines the resistance of the variable resistance devices 92 and 96. The DC conduction path for the control of unijunction transistor 96 is through the inductance 62 (approximately .3 $\mu H$), the base 97 and emitter 95, resistor 58 (about 75 ohms) and RF choke 73. The DC conduction path for the control of unijunction transistor 92 is through the RF choke 100, the resistor 60 (about 75 ohms), the base 91, the emitter 93 and the RF choke 73. The value of capacitor 54 is about 8.2 pF and the value of RF coupling capacitor 94 is about .02$\mu F$. The resistance variations of the unijunction transistors have matched characteristics so that a single control voltage may be used. The DC control voltage permits slight bias correction to compensate for relative displacements of the unijunction emitter-base characteristics of the transistors 92 and 96. For a device as shown in FIG. 4 with the component values as indicated 8 db cable correction is possible over a bandwidth from about 5 to 100 MHz.

In the operation of FIG. 4 it should be realized that the AGC pilot provides across-the-band gain control and the thermal pilot is used to control the tilt of the network 14. Thus, the frequency location of the thermal pilot in the bandwidth is determinative of the amount of tilt desired, As is evident from FIG. 2, the change in attenuation of the thermal pilot signal at the *F*3 frequency is sufficiently wide as a function of temperature to provide proper control of the thermal compensation network 14. The operation of the circuit of FIG. 4 is essentially closed-loop in that the thermal pilot signal which was inserted at the start of the cable as been subjected to the actual conditions prevailing in the vicinity of the transmission line. The selection of the thermal pilot may be at different locations within the band, in which case the change in the components of the circuit of FIG. 4 must be made as is well known to one with ordinary skill in the art.

While the foregoing description sets forth the principles of the invention in connection with specific embodiments, it is to be understood that the description is only by way of example and not as a limitation of the scope of the invention which is set forth in the following claims.

We claim:

1. A device for equalizing the transmission of radio frequency signals within predetermined bandwidth over a cable exhibiting variable transmission characteristics as a function of temperature and frequency, comprising an equalization network coupled in series with the cable for substantially equalizing at a preselected ambient temperature the cable attenuation of signal frequencies within said bandwidth, and a thermal compensation network coupled in series with the cable and said equalization network, said thermal compensation network having a preselected temperature-sensitive attenuation characteristic which varies as a function of frequency to compensate for thermally caused changes in the cable characteristics for temperatures different from said preselected ambient temperature.

2. The device as recited in claim 1 wherein said thermal compensation network compensates for ambient temperatures above and below said preselected ambient temperature.

3. A device for equalizing the transmission of radio frequency signals within a preselected bandwidth over a cable exhibiting variable transmission characteristics as a function of temperature and frequency, comprising an equalization network connected in series with the cable for substantially equalizing at a preselected ambient temperature the cable attenuation of signal frequencies within said bandwidth, and a thermal compensation network connected in series with the cable and said equalization network and presenting a first attenuation at said preselected temperature, said thermal compensation network presenting a decreased attenuation from said first attenuation at the low end of the bandwidth at low ambient temperatures and presenting an increased attenuation relative to said first attenuation at the low end of the bandwidth at high ambient temperatures.

4. A device for equalizing the transmission of radio frequency signals within a preselected bandwidth over a cable exhibiting variable transmission characteristics as a function of temperature and frequency, comprising an equalization network connected in series with the cable for substantially equalizing at a preselected ambient temperature the cable attenuation of signal frequencies within said bandwidth, and a thermal compensation network connected in series with the cable and said equalization network, said thermal compensation network providing a minimum tilt at said preselected temperature, a negative sloping tilt at temperatures lower than said preselected temperature, and a positive sloping tilt at temperatures greater than said preselected temperature.

5. A device for equalizing the transmission radio frequency signals within a preselected bandwidth over a cable exhibiting variable transmission characteristics as a function of temperature and frequency, comprising an equalization network connected in series with the cable for substantially equalizing at a preselected ambient temperature the cable attenuation of signal frequencies within said bandwidth, a voltage-controlled thermal compensation network connected in series with the cable and said equalization network, means providing a thermal pilot signal having a selected frequency within the bandwidth and for inserting said thermal pilot signal for transmission in the cable, and means responsive to the thermal pilot signal for generating a control voltage indicative of the pilot signal and for applying the control voltage to the voltage-controlled thermal compensation network for varying the attenuation of the network for temperature compensation of said cable transmission system.

6. The device as recited in claim 5 wherein said thermal pilot signal frequency is selected near one end of the bandwidth.

7. The device as recited in claim 6 wherein said thermal pilot signal frequency is selected near the low end of the bandwidth.

8. The device as recited in claim 6 wherein said thermal pilot signal frequency is located in a region which spans a frequency range up to about 25 percent of the total bandwidth.

9. A device for equalizing the transmission of radio frequency signals within preselected bandwidth over a cable exhibiting variable transmission characteristics as a function of temperature and frequency, comprising means for providing an automatic gain control pilot signal having a selected frequency within the bandwidth and inserting said AGC pilot for transmission in the cable, means responsive to the AGC pilot signal for automatically controlling the gain of the cable transmission system, means for providing a thermal pilot signal for transmission in the cable and having a frequency selected within the bandwidth substantially remote from the frequency of the AGC pilot, a voltage-controlled thermal compensation network connected in series with the cable, and means responsive to the thermal pilot signal for generating a control voltage indicative thereof and applying the control voltage to the voltage-controlled thermal compensation network for varying the attenuation of the network for temperature compensation of said cable.

10. The device as recited in claim 9 wherein said AGC pilot signal frequency is selected near one end of the bandwidth and the thermal pilot signal frequency is selected near the other end of the bandwidth.

11. The device as recited in claim 10 wherein said AGC pilot frequency is selected near the high end of the bandwidth and said thermal pilot frequency is selected near the low end of the bandwidth.

12. The device as recited in claim 9 wherein said thermal pilot frequency is selected near the low end of the bandwidth.

13. The device as recited in claim 10 wherein the frequencies of said pilot signals are separated from one another by about 50 percent of the frequency range of the bandwidth.

14. The device as recited in claim 10 wherein the thermal pilot frequency is located in an end of the bandwidth region which spans a frequency range up to about 25 percent of the total bandwidth and wherein the AGC pilot frequency is located in the other end of the bandwidth region which spans a frequency range up to about 35 percent of the total bandwidth.

15. The device as recited in claim 10 wherein said thermal compensation network further comprises:

a bridge *T* network coupled in series with the cable and having input and output impedances matched to the characteristic impedance of the cable, said bridge *T* network further having;

a first voltage-controlled variable resistance device coupled across the upper part of the *T* network;

a second voltage-controlled variable resistance device coupled in the upright portion of the *T* network; and means providing a DC voltage control path to said first and second voltage-controlled devices for control of the resistance of said devices.